United States Patent Office 3,003,849
Patented Oct. 10, 1961

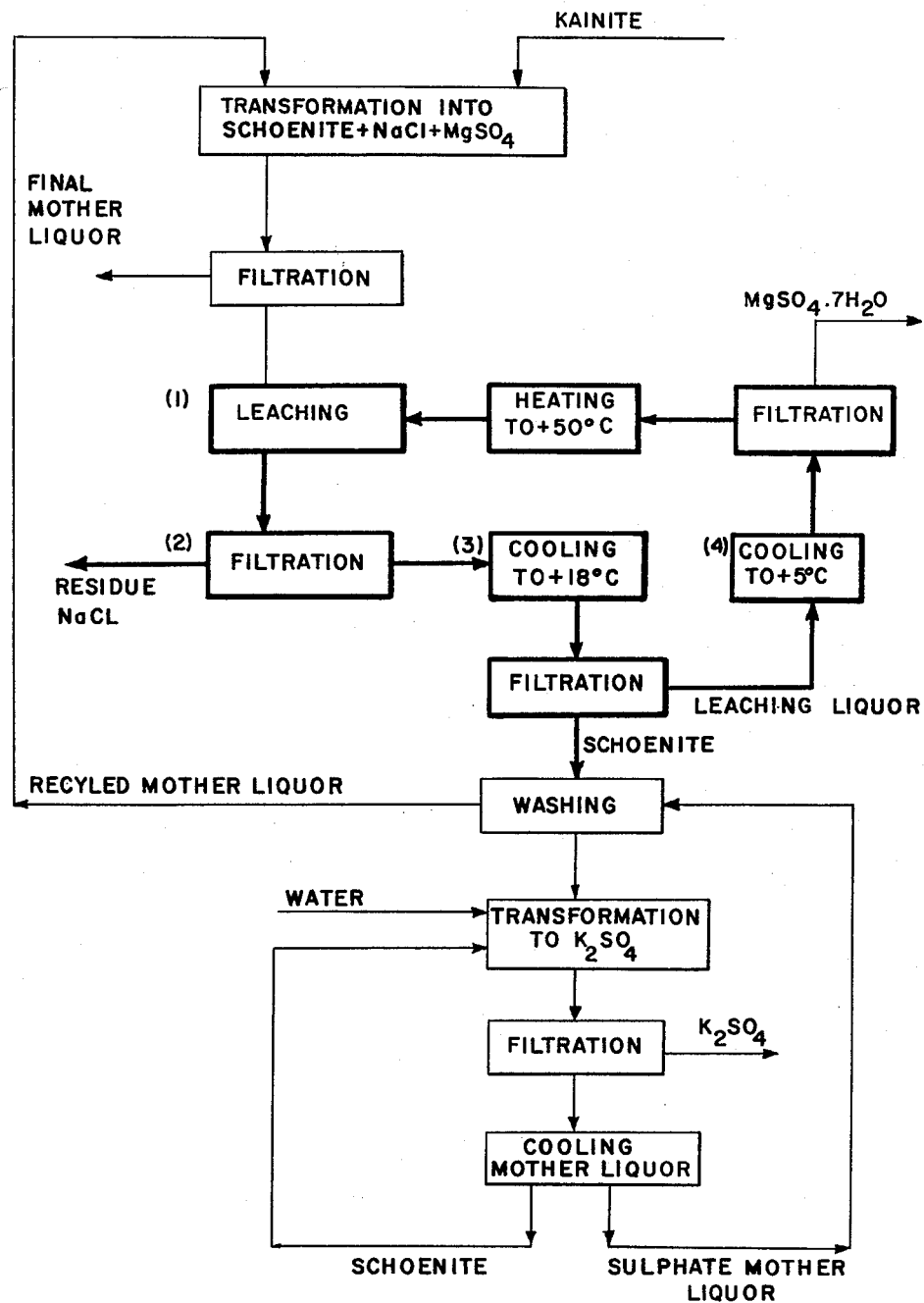

3,003,849
PROCESS FOR THE SEPARATION OF SCHOENITE FROM MIXTURES OF SCHOENITE, SODIUM CHLORIDE AND MAGNESIUM SULPHATE
Giacinto Veronica, Novara, Italy, assignor to Montecatini Societa Generale per l'Industria Mineraria e Chimica, a corporation of Italy
Filed Oct. 17, 1958, Ser. No. 767,956
Claims priority, application Italy Oct. 18, 1957
2 Claims. (Cl. 23—38)

The present invention relates to a process for the separation of Schoenite from mixtures consisting essentially of Schoenite, NaCl and $MgSO_4$ by means of a selective leaching operation.

In the copending U.S. patent application No. 658,710 to Gerlando Marullo et al., filed May 13, 1957 and assigned to the assignee of the present invention (now abandoned), there is described a process for processing natural crude kainite containing NaCl as an impurity and comprising the step of transforming said mineral into a saline mixture composed of a double potassium-magnesium sulfate NaCl and $MgSO_4$. According to what is described in the aforementioned application, the separation of the potassium salt is carried out by flotation. The practically pure potassium salt thus obtained is leached with water at 48° C., taking advantage of the known characteristic of incongruous solubility, thereby obtaining a $K_2SO_4$ solid residue and a mother liquor, essentially consisting of $K_2SO_4$ and $MgSO_4$, which is recycled for the attack of the raw mineral.

It is the principal object of the present invention to provide a method for separating individual salts from a crystalline mixture of hydrated $K_2SO_4MgSO_4$ (such as Schoenite or Leonite), sodium chloride and magnesium sulfate by subjecting the mixture to leaching and selective crystallization, and controlling the solution temperature based upon the different properties of the individual salts as concerns the variation of their respective solubility with temperature, to thereby selectively precipitate out said individual salts from the solution.

As is known, Schoenite treated with water at a temperature of 48° C. gives solid $K_2SO_4$ and sulphate mother liquor containing $K_2SO_4$ and $MgSO_4$. Usually, the sulphate mother liquor is employed for treating Kainite and converting it into Schoenite. When natural Kainites containing sodium chloride are treated, no pure Schoenite is obtained, but instead a mixture constituted of the particular double potassium magnesium sulphate (Schoenite $K_2SO_4MgSO_4 \cdot 6H_2O$, or Leonite $K_2SO_4MgSO_4 \cdot 4H_2O$), NaCl and $MgSO_4$.

The leaching and selective crystallization process which is the object of the present invention is applied to this mixture.

The process of the present invention is based on the different properties of the single salts as concerns the variation of their solubilities with temperature; more precisely while the solubility of sodium chloride remains almost unvaried within a rather wide temperature range, that of the double sulfate and of magnesium sulfate depends linearly on temperature.

Obviously, the characteristics of solubility of each salt, in addition to a reciprocal influence, are conditioned by the salt concentration of solution which serves to dissolve and reprecipitate them by means of suitable temperature variations and therefore there take place phenomena which cannot be foreseen on the basis of the simple knowledge of the single solubilities in water; for instance, in the conditions followed in practice a more rapid decrease in the solubility of $MgSO_4$ is observed in respect of that of Schoenite when the reaction is kept within a temperature range comprised between 0° and 30° C.

If one desires that the dissolving and re-crystallization phenomena occur repeatedly with regularity, it is therefore necessary to operate in such conditions that the composition of the leaching solution in cycle does not undergo high variations.

This makes it necessary to comply with 2 conditions: first, to use a solution in which the concentration of the various salts are balance, with respect to the salt mixture to be treated, so that preferential dissolution of one or more salts which are detrimental to the others are avoided; moreover, the working cycle should be carried out under such conditions as to avoid or to reduce to a minimum the chemical reactions between the salts present in solution, since the new compounds thus formed would alter the physical characteristics of the system.

Of the possible undesirable reactions the most dangerous is the following one:

$$2\ NaCl + MgSO_4 \rightarrow Na_2SO_4 + MgCl_2 \qquad (1)$$

since it causes the formation of magnesium chloride which, as it is known, highly alters the solubility of the salts which are here of interest.

On the basis of the aforementioned considerations and circumstances, our invention allows a satisfactory solution of the problem by means of a cycle carried out according to the following description.

The abovementioned and other objects, features and advantages will appear more clearly from the following detailed description when read in conjunction with the appended flow sheet.

The process of the present invention comprises the following steps:

(1) The mixture consisting of Schoenite, NaCl and $MgSO_4$ is treated at a temperature of about 50° C. with a leaching liquor saturated in the cold with $K_2SO_4$ and KCl, containing from 80 to 120 g./l. $MgCl_2$ and up to 140 g./l. of $MgSO_4$; thus Schoenite and $MgSO_4$ is brought into solution.

(2) The residue, consisting of NaCl, of the previous leaching operation is separated from the liquid by means of decantation and/or filtration.

(3) The liquid of step 2 is cooled at a temperature ranging from 15 to 18° C. in order to precipitate Schoenite contaminated by the presence of NaCl.

(4) The liquid of step 3 is cooled at a temperature within the range 0–5° C. in order to precipitate $$MgSO_4 \cdot 7H_2O$$

and is then recycled to step 1.

At step 1, we start with a mother liquor solution at 18° C. and containing NaCl, $MgSO_4$, $K_2SO_4$ and $MgCl_2$; the concentration of sodium chloride and Schoenite corresponds to the degree of saturation allowed by the presence of $MgCl_2$. The concentration of the latter can on the contrary vary over a rather wide range, the limits being represented respectively by the following circumstances: the lower limit by the fact that the presence of a certain amount of $MgCl_2$ is necessary in order to buffer the reaction of Equation 1 and the upper limit by the necessity of having a satisfactory increase in the solubility of Schoenite for a given temperature variation. The optimum zone which complies with both conditions is given by a $MgCl_2$ concentration of 80 to 120 g./l.

The upper temperature limit cannot practically go above 50° C. since, over this value reaction (2) takes place in a remarkable way; at this temperature it is also convenient to limit the contact between the leaching solution and the saline mixture to the time strictly needed for obtaining the dissolving, that is from 10 to 20 minutes.

In the stage of heating to 50° C., the $K_2SO_4$ and

MgSO₄ of Schoenite, and magnesium sulfate, which is present as a mol in the saline mixture, pass into solution.

Sodium chloride remains almost completely in the residue. By cooling to 15°–18° C., Schoenite more or less impure with NaCl is separated, the amount of the NaCl impurity depending upon the MgCl₂ concentration of the solution. The cold solution has a higher MgSO₄ content than the similar starting solution. This phenomenon takes place repeatedly and more widely as the solution is used again until the MgSO₄ concentration becomes such as to cause the reaction of Equation 1 to take place.

This limit of MgSO₄ content varies in relationship to the amount of MgCl₂ present. For instance, for MgCl₂ concentrations in the order of 90 to 100 g./l., the MgSO₄ amounts to 130 to 140 g./l. At this point, after separation of Schoenite by cooling to 15°–18° C., a supplementary cooling to 0°–5° C. becomes necessary in order to discharge the excess MgSO₄ which, because of its very good characteristics of purity, represents an interesting side product of the cycle.

Merely as examples, some data are reported hereinbelow in order to illustrate the above description.

Example 1

1 kg. salt having the composition:

$K_2O$, 8.75%; Na, 14.4%; Mg, 4.3%; Cl, 22.2%; $SO_4$, 25.9%; $H_2O$, 25.9% corresponding to a mixture of NaCl, Schoenite and MgSO₄ are leached for 10 minutes at 50° C. with 2.5 liters of a solution containing: Na, 58; Mg, 40.5; Cl, 162; $SO_4$, 88.5; $K_2$, 27 g./l., respectively.

The insoluble residue is separated; the mother liquor at 50° C. is cooled to 17° C.

450 g. crystals having the following composition are precipitated:

$K_2O$, 15.5%; Na, 4.8%; Mg, 5.1%; Cl, 8.4%; $SO_4$, 35.8%; $H_2O$ to 100% and 2.65 liters of solution having the following composition are obtained:

$K_2O$, 29.6 g./l.; Mg, 44.5 g./l.; Na, 60 g./l.; Cl, 163 g./l.; $SO_4$, 111 g./l.

The insoluble residue, amounting to 320 g. contains 0.55% $K_2O$. Since the cold mother liquor obtained is recycled, the yield of the operation is calculated by difference between the $K_2O$ introduced with the saline mixture and that discharged with the residue and with the volume increase of the solution, which is considered as lost.

The yield amounts therefore to 92.9%.

Example 2

1.250 kg. saline mixture having the following composition:

$K_2$, 7%; Mg, 3.9%; Na, 17.3%; Cl, 26.7%; $SO_4$, 22.55%; $H_2$ to 100% are leached in the same conditions with 2.5 liters of a previously obtained cold solution.

580 g. residue containing at 0.7% $K_2O$, 490 g. Schoenite impure of NaCl are obtained having the following composition:

$K_2O$, 17.3%; Na, 4.5%; Mg, 5%; Cl, 7.15%; $SO_4$, 37.5%; $H_2O$ to 100% and 2.65 liters of cold mother liquor containing: $K_2O$, 28 g./l.; Mg, 47.2 g./l.; Na, 60 g./l.; Cl, 160 g./l.; $SO_4$, 125 g./l.

The yield, calculated as mentioned under Example 1 above, is 90.6%.

Example 3

By recycling the cold water obtained as in Example 2 and leaching under the same conditions 0.800 kg. of a saline mixture having the following composition:

$K_2O$, 11%; Mg, 4.8%; Na, 10.7%; Cl, 16.6%; $SO_4$, 30.2%; $H_2O$ to 100%

190 g. of a residue containing 1.6% $K_2O$, 450 g. Schoenite impure of NaCl and having the following composition: $K_2O$, 18%; Na, 3.7%; Mg, 5.3%; Cl, 6.6%; $SO_4$, 38.1; $H_2O$ to 100% and 2.65 liters of cold mother water containing: $K_2O$, 28 g./l.; Mg, 49.5 g./l.; Na, 59.1 g./l.; Cl, 154 g./l.; $SO_4$, 142 g./l. are obtained.

The yield amounts to 91.8%.

Example 4

2.65 liters mother liquor having a composition similar to that obtained by leaching as in Example 3, are cooled to +5° C.

340 g. $MgSO_4 \cdot 7H_2O$ are separated, having the following composition:

$K_2O$, 0.3%; Na, 1.2%; Mg, 8.8%; Cl, 0.7%; $SO_4$, 38%; $H_2O$ to 100% and 2.5 liters mother liquor containing: $K_2O$, 29 g./l.; Mg, 40.5 g./l.; Na, 61 g./l.; Cl, 162 g./l.; $SO_4$, 98 g./l. are obtained which are used for again starting the cycle according to the preceding examples.

As can be seen, the leaching solution does not vary its composition remarkably between one and the other cycle since the differences found can be ascribed to common analytical error; a volume increase occurs in the dissolution and crystallization stage of Schoenite and a decrease in the MgSO₄ crystallization stage.

The actual yields are therefore a little higher than those calculated above and can be evaluated to average 94%. As far as the purity of various products obtained is concerned, the residue appears to consist, as an average, of 82.5% NaCl, 10 to 11% $H_2O$; the difference to 100 being represented by sulfates.

The crystallized Schoenite, as we have said, is impure with 10–12% NaCl which is the only impurity present.

Magnesium sulfate has a content of 95% on the dry product, as determined by titration, the remainder consisting of small amounts of imbibition salts which can easily be eliminated by the usual purification operations.

The Schoenite also requires a washing in order to remove sodium chloride; this washing is carried out directly on the filter containing the salt, by means of the cold sulfate solution, obtained in the conversion of Schoenite to $K_2SO_4$ by treatment with water, before the sulfate solution is used for the attack of Kainite to transform it to the mixture of Schoenite NaCl and MgSO₄.

The cycle as a whole and the order of the single operations is illustrated in the accompanying flow diagram.

It will be obvious to those skilled in the art, upon a study of this disclosure, that the present invention permits of various modifications and alterations with respect to the individual components and method steps disclosed, and hence can be embodied in equipment other than as particularly illustrated and described herein, without departing from the essential features of the invention and within the spirit and scope of the claims annexed hereto.

I claim:

1. A process for separating hydrated double potassium-magnesium sulfate from a salt mixture thereof with sodium chloride and magnesium sulfate, comprising the steps of leaching said salt mixture at about 50° C. with a selective liquor saturated with $K_2SO_4$ and NaCl, said selective liquor containing 80–120 g./l. MgCl₂ and up to 140 g./l. MgSO₄, until the double potassium-magnesium sulfate contained in said salt mixture is dissolved in said selective liquor, the NaCl contained in the salt mixture remaining undissolved, cooling the solution to a temperature of approximately 15° to 18° C. to precipitate out the hydrated double potassium-magnesium sulfate, further cooling the solution to a temperature of approximately 0° to 5° C. to precipitate out $MgSO_4 \cdot 7H_2O$, and recycling the selective leaching liquor.

2. Process according to claim 1, including the further steps of washing with a sulfate mother liquor the precipitated hydrated double potassium-magnesium sulfate to remove NaCl remaining in the latter as an impurity, said sulfate mother liquor comprising a conversion liquid from the production of $K_2SO_4$ and containing double potassium-magnesium sulfate, potassium sulfate and magnesium sulfate, treating a portion of pure double potassium-magnesium sulfate with water to convert same to crystalline $K_2SO_4$ and said mother liquor, and recycling the mother liquor so formed to said washing step.

References Cited in the file of this patent
UNITED STATES PATENTS

| | | |
|---|---|---|
| 229,249 | Hake | June 29, 1880 |
| 1,939,174 | Kaselitz | Dec. 12, 1933 |
| 2,437,182 | Barr et al. | Mar. 2, 1948 |
| 2,766,884 | Marullo et al. | Oct. 16, 1956 |
| 2,766,885 | Marullo et al. | Oct. 16, 1956 |
| 2,788,257 | Duke | Apr. 9, 1957 |
| 2,862,788 | Stanley et al. | Dec. 2, 1958 |
| 2,902,344 | Cevidalli | Sept. 1, 1959 |

OTHER REFERENCES

Lange: "Handbook of Chemistry," 5th ed., pages 204–205, Handbook Published Inc. 1944.